(12) United States Patent
Brown et al.

(10) Patent No.: US 7,820,941 B2
(45) Date of Patent: Oct. 26, 2010

(54) PROCESS AND APPARATUS FOR SCORING A BRITTLE MATERIAL

(75) Inventors: James W Brown, Painted Post, NY (US); Harry E Menegus, Beaver Dams, NY (US)

(73) Assignee: Corning Incorporated, Corning, NY (US)

( * ) Notice: Subject to any disclaimer, the term of this patent is extended or adjusted under 35 U.S.C. 154(b) by 590 days.

(21) Appl. No.: 10/903,701

(22) Filed: Jul. 30, 2004

(65) Prior Publication Data

US 2006/0022008 A1 Feb. 2, 2006

(51) Int. Cl.
*B23K 26/00* (2006.01)

(52) U.S. Cl. ............................ 219/121.69; 219/121.68; 219/121.72; 219/121.67; 219/121.84

(58) Field of Classification Search ............ 219/121.69, 219/121.68, 121.67, 121.78, 121.8, 121.84, 219/121.85
See application file for complete search history.

(56) References Cited

U.S. PATENT DOCUMENTS

| | | | |
|---|---|---|---|
| 3,453,097 A | 7/1969 | Hafner et al. ................ 65/112 |
| 3,610,871 A | 10/1971 | Lumley .................. 219/121 L |
| 4,467,168 A | 8/1984 | Morgan et al. ........ 219/121 LG |
| 4,500,771 A * | 2/1985 | Miller .................... 219/121.68 |
| 5,084,604 A | 1/1992 | Dekker et al. .......... 219/121.72 |
| 5,132,505 A | 7/1992 | Zonneveld et al. ......... 21/121.6 |
| 5,138,131 A | 8/1992 | Nishikawa et al. ....... 219/12.67 |
| 5,498,851 A | 3/1996 | Hayashi et al. .......... 219/121.7 |
| 5,609,284 A | 3/1997 | Kondratenko .................. 225/1 |
| 5,622,540 A | 4/1997 | Stevens ...................... 65/112 |
| 5,776,220 A * | 7/1998 | Allaire et al. ................ 65/112 |
| 5,825,801 A | 10/1998 | Nishida et al. ............... 372/99 |
| 5,968,382 A | 10/1999 | Matsumoto et al. .... 219/121.72 |
| 5,984,159 A | 11/1999 | Ostendarp et al. .......... 225/93.5 |
| 6,023,039 A | 2/2000 | Sawada ................ 219/121.61 |
| 6,211,488 B1 | 4/2001 | Hoekstra et al. ....... 219/121.72 |
| 6,236,446 B1 | 5/2001 | Izumi et al. ................ 349/187 |
| 6,252,197 B1 * | 6/2001 | Hoekstra et al. ....... 219/121.84 |
| 6,259,058 B1 | 7/2001 | Hoekstra ............... 219/121.75 |
| 6,300,593 B1 * | 10/2001 | Powell .................. 219/121.68 |
| 6,327,875 B1 | 12/2001 | Allaire et al. ................ 65/103 |
| 6,407,360 B1 | 6/2002 | Choo et al. ........... 219/121.67 |
| 6,420,678 B1 | 7/2002 | Hoekstra ............... 219/121.75 |
| 6,423,930 B1 | 7/2002 | Matsumoto ............. 219/121.69 |
| 6,489,588 B1 * | 12/2002 | Hoekstra et al. ....... 219/121.67 |
| 6,501,047 B1 | 12/2002 | Xuan et al. ............ 219/121.69 |
| 6,541,732 B2 * | 4/2003 | Hirose et al. ............. 219/121.7 |
| 2001/0035447 A1 | 11/2001 | Gartner et al. ................. 225/2 |
| 2002/0006765 A1 * | 1/2002 | Michel et al. ................ 451/28 |
| 2002/0125232 A1 | 9/2002 | Choo et al. ............ 219/121.69 |

* cited by examiner

*Primary Examiner*—M. Alexandra Elve
(74) *Attorney, Agent, or Firm*—Kevin M. Able

(57) ABSTRACT

The present invention relates to a process for laser scoring of flat glass sheets. The process comprises manipulating a laser beam having a substantially Gaussian intensity profile to produce an elongated heating zone on the glass sheet to be scored, the elongated heating zone having a central portion with a lower temperature than a temperature of an outer portion of the heating zone. An initial crack is made in the glass sheet, the elongated heating zone is traversed across the glass sheet coincident with the initial crack, and the heated glass is thermally shocked by directing a cooled liquid against the heated glass, thus propagating the crack. The scored glass sheet may thereafter be broken by applying bending techniques as are known in the art.

15 Claims, 7 Drawing Sheets

PROCESS AND APPARATUS FOR SCORING A BRITTLE MATERIAL

BACKGROUND OF THE INVENTION

1. Field of the Invention

The present invention relates to a method for breaking sheets and other brittle materials, more particularly a method for laser scoring of flat glass sheets.

2. Technical Background

Lasers have been used heretofore for separating sheets of brittle material, especially flat sheets of glass, by propagating a so-called blind crack across a glass sheet to break the sheet into two smaller glass sheets. This partial crack, which extends partway through the depth of the glass sheet, essentially operates as a score line. The sheet is then separated into two smaller sheets by mechanical breaking along the line of the score line.

In one embodiment, a small nick or scribe is made at one side of the glass sheet, and this nick or scribe is then propagated in the form of a partial crack through the glass sheet using a laser. The laser is then contacted with the glass sheet in the area of the nick or scribe and the laser and glass sheet are moved relative to one another, so that the laser travels in the desired path of the score line. A stream of fluid coolant is preferably directed at a point on the heated surface of the glass just downstream from the laser, so that after the laser has heated a region of the glass sheet, the heated region is quickly cooled. In this way, the heating of the glass sheet by the laser and the cooling of the glass sheet by the fluid coolant creates stresses in the glass sheet which cause the crack to propagate in the direction that the laser and coolant have traveled.

The development of such laser scoring techniques has resulted in some good results in terms of quality break edges, making them potentially useful in the manufacture of liquid crystal and other flat panel display substrates, where the quality of edge breaks is desirably very high. Recent advances have shown that the use of a multimoded laser (e.g. a D-mode laser) was effective in reducing the optical power impinging on the glass at the center of the beam, thus producing a more even temperature profile across the spot on the glass where the beam impinges. However, multimoded lasers are often higher in cost, require greater maintenance, and can be significantly more unwieldy than sealed beam single-mode lasers.

It would be desirable to design a laser scoring process which is capable of high scoring speeds, e.g., on the order of at least 300 mm/second, more preferably at least 500 mm/second, and most preferably at least 1000 mm/sec, which would simplify the scoring and braking processes for the production of flat panel display substrates.

SUMMARY

In one broad aspect, the invention comprises impinging a laser beam which is emitted with a substantially Gaussian intensity profile onto a glass sheet in such a manner that the Gaussian laser beam forms an elongated heating zone on the glass sheet, with the heating zone having a temperature minimum within a central region of the heating zone. Preferably, the length of the elongated heating zone is at least about 30 mm; more preferably at least about 50 mm; even more preferably at least about 100 mm. The elongated heating zone is preferably not truncated, such as by intercepting (blocking) any portion of the beam, or by turning the laser on or off during a portion of the elongated closed path.

The invention preferably further comprising producing relative motion between the glass sheet and the elongated heating zone along a predetermined scoring path on the glass sheet, the relative motion being at least about 300 mm/s, thereby forming a heated scoring path. The relative motion is more preferably at least about 500 mm/s; and most preferably at least about 1000 mm/s. The relative motion may be produced by moving the glass sheet while the laser and associated optical elements remain stationary, or by moving the laser and/or associated optical elements while the glass sheet is maintained stationary, or a combination of both. For large glass sheets, it is preferable that the glass sheet remain stationary. Preferably, the invention also includes contacting the heated scoring path with an aerosol, liquid or gas coolant.

One embodiment according to the invention comprises moving a continuously emitting laser beam having a substantially Gaussian intensity profile in a circular orbit about an axis, directing the orbiting laser beam through at least one optical element, thereby transforming the circular beam orbit into an elongated beam orbit, impinging the transformed beam on a glass sheet to describe an elongated closed path on the glass sheet, thereby forming an elongated radiation spot on the sheet having a length and a width, the length being longer than the width, the spot further having an intensity minimum within a central portion of the spot. Preferably, the laser beam is moved in a circular orbit by reflecting the laser beam from a moving mirror.

Another embodiment of the present invention comprises moving a continuously emitting laser beam having a substantially Gaussian intensity profile in a circular orbit about an axis, directing the laser beam through at least one optical element, thereby transforming the circular beam orbit into an elongated beam orbit, impinging the transformed beam on a glass sheet to describe an elongated closed path on the glass sheet, thereby forming an elongated radiation spot on the sheet having a length and a width, the length being longer than the width, the spot further having an intensity minimum within a central portion of the spot. Preferably, the laser beam is moved in a circular orbit by refracting the laser beam through a rotating optical element, such as a lens or prism.

In another broad aspect of the present invention, a method of scoring a glass sheet is disclosed comprising collimating a continuously emitting laser beam having a substantially Gaussian intensity profile, directing the collimated laser beam through a faceted optical element to obtain a plurality of beams, each beam having a substantially Gaussian intensity profile, impinging the plurality of beams on a glass sheet in an elongated pattern to form a single elongated heating zone having a length and a width, the length being longer than the width, and wherein the elongated heating zone has a temperature minimum within a central portion of the heating zone. Preferably, the faceted optical element produces a plurality of beams which impinge on the glass surface. The plurality of beams preferably comprises at least about 6 beams.

In still another broad aspect of the invention, an apparatus for laser scoring a glass sheet is disclosed, the apparatus comprising a laser which emits a continuous beam along an optical path, the beam having a substantially Gaussian intensity profile, a collimator located on the optical path and after the laser for collimating the beam, and an integrator lens located on the optical path and after the collimator for dividing the beam into a plurality of beams which impinge on a glass sheet to form a crack.

The invention will be understood more easily and other objects, characteristics, details and advantages thereof will become more clearly apparent in the course of the following explanatory description, which is given, without in any way implying a limitation, with reference to the attached Figures.

DETAILED DESCRIPTION

The present invention relates to a system for breaking glass sheets along a desired line of separation using a laser scoring technique. A laser effectively heats a glass sheet in a localized heating zone along a desired line of separation. The temperature gradient thus produced induces tensile stresses in the surface layers of the material and as these stresses exceed the tensile strength of the material, the material develops a blind crack penetrating the material down to the regions which are under compression.

Figure 1:
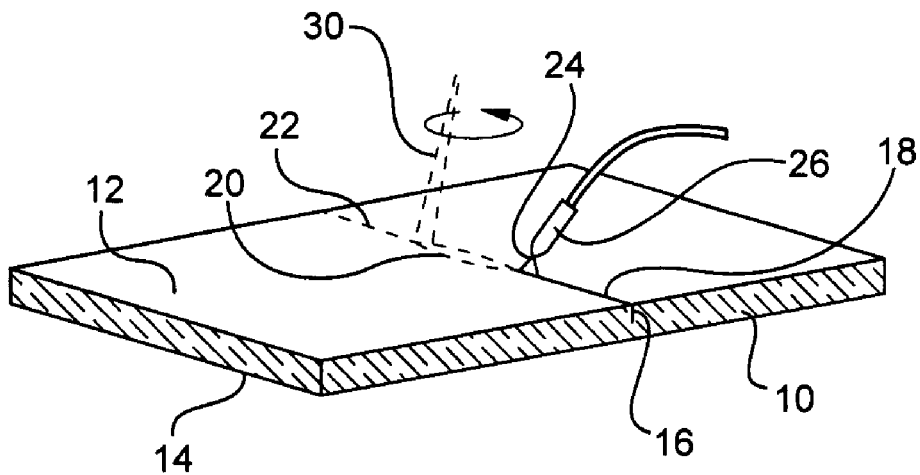
FIG. 1 is a perspective view of a laser scoring system according to the present invention, illustrating an orbiting laser beam impinging on a glass sheet, a heating zone and a coolant delivery mechanism.
Figure 2:
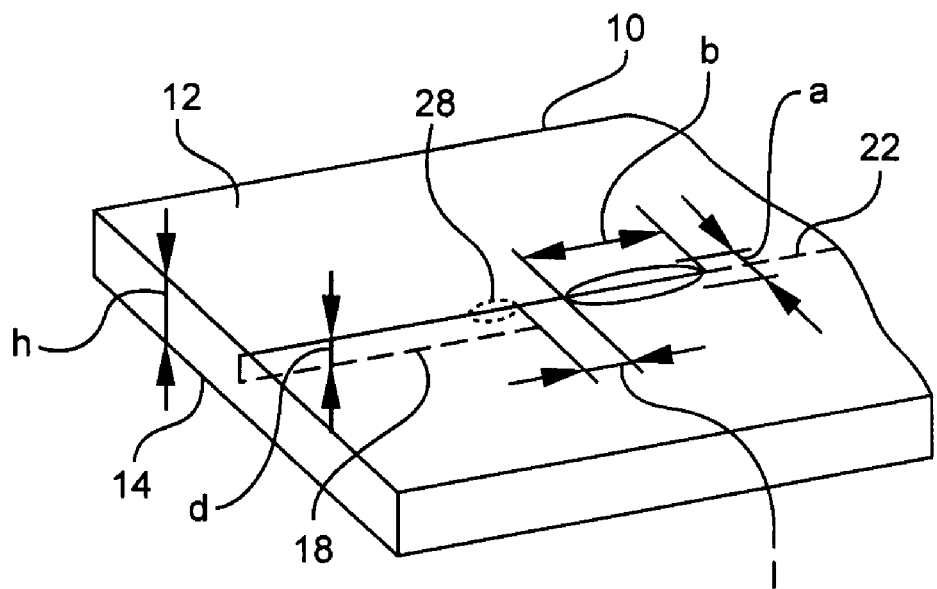
FIG. 2 is a perspective view of the glass sheet of FIG. 1 showing the relationship between the heating zone, the coolant spot and the crack resulting therefrom.

As illustrated in FIGS. 1 and 2, in the glass breaking system of the present invention, glass sheet 10 has upper 12 and lower 14 (not shown) major surfaces. Glass sheet 10 is first nicked or scored along one edge of the glass sheet to form a crack initiation point 16 at one edge of the glass sheet 10. Crack initiation point 16 is then used to form crack 18 by movement of heating zone 20 across glass sheet 10 along a pre-determined score path (the desired line of separation), such as that indicated by dashed line 22. Preferably, a coolant 24 is applied through nozzle 26 to enhance the stress distribution and thereby enhance crack propagation. Coolant 24 is preferably a liquid, or an aerosol (or mist), but may be, for example, a gas. The coolant may be one of the so-called noble elements—helium, neon, argon, krypton, xenon and radon, or a combination thereof—which is applied to the glass sheet through nozzle 26. In some cases, however, water has proven to be an effective coolant.

In one embodiment, a tank (not shown) pressurized with air delivers coolant 24 through nozzle 26 onto upper glass surface 12 behind the traversing heating zone 20 created by a laser beam (generically indicated by reference numeral 30 in FIG. 1) impinging on surface 12 of the glass sheet. Preferably nozzle 26 comprises a central passage through which a liquid coolant, e.g. water, is jetted. The central passage is surrounded by an annular passage through which pressurized air is flowed to collimate the liquid and break up the liquid flow to create an aerosol. An aerosol typically has a greater heat capacity than a gas and therefore provides enhanced cooling when compared to a gas. Preferably the liquid is jetted through the central nozzle at a rate of at least about 3 ml/s, and forms a collimated spray of about 4 mm in diameter.

Alternatively, nozzle 26 is an ultrasonic nozzle supplied with a mixture of a suitable liquid coolant and air. If a liquid is applied to the surface of the glass, it is desirable to remove the excess liquid to prevent staining or other contamination of glass surface 12, for example by vacuuming the excess liquid. As the heating zone 20 is moved across the glass, the crack follows the path traveled by the heating zone.

In still another alternative cooling method, nozzle 26 is a nozzle similar to those used for water jet cutting operations, wherein a concentrated jet of liquid is delivered to the glass surface. Such nozzles may have an outlet passage as small as 0.007 inches in diameter. Preferably, nozzle 26 is within about 0.25 inches to 0.75 inches of upper glass surface 12 and delivers a spray pattern of between about 2 mm and 4 mm wide on the glass surface.

Because the temperature of the surface of the glass sheet 10 at heating zone 20 is directly dependent on the time of exposure of the surface to the laser beam, employing a heating zone having an elongated (e.g. elliptical or rectangular) instead of a circular foot print extends the heating time for each point on surface 12 along predetermined score path 22 for the same rate of relative displacement of the heating zone. Hence, with a set power density for the laser beam, and with a constant distance l from the trailing edge of the heating zone to the front edge of coolant spot 28, which is essential for maintaining the desired heating depth of glass sheet 10, and the further heating zone 20 is extended in the displacement direction, the greater will be the allowable rate of the relative displacement of the heating zone across the glass surface.

As illustrated in FIG. 2, in the present invention the heating zone has an extremely elongated shape, with major axis b greater than 30 mm; more preferably greater than 50 mm; and even more preferably greater than 100 mm. Minor axis a is preferably less than about 7 mm. Elongated axis b of the heating zone is aligned with the direction of travel of the predetermined scoring path across the glass sheet. For thin sheets of glass (e.g. less than about 1 mm), the optimum length of major axis b of the heating zone is related to the desired speed of travel in that major axis b should preferably be greater than 10 percent of the desired laser scoring speed per second. Thus, for a desired laser scoring speed of 500 mm/s on 0.7 mm thick glass, the major axis of the heating zone should preferably be at least 50 mm long.

Crack 18 preferably extends only partially (distance d) into the depth of glass sheet 10 so that the crack acts as a score line. Final separation of the glass sheet into smaller sheets is then achieved by applying a bending moment under crack 18. Such a bending moment can be applied using conventional bending apparatus (not shown) and techniques such as are used to break glass sheets in processes employing more conventional mechanical surface scoring methods. Because crack 18 is formed using a laser scoring technique rather than mechanical scoring, the formation of glass chips during the mechanical breaking step is greatly minimized compared to past techniques.

The laser beam used for the glass breaking operation should be able to heat the surface of the glass to be cut. Consequently, the laser radiation preferably is at a wavelength which can be absorbed by the glass. For this to occur, the radiation should preferably be in the infra-red range, with a wavelength in excess of 2 µm, preferably a $CO_2$ laser, with a wavelength of 9-11 µm. While the majority of current experiments have employed the use of $CO_2$ lasers having powers in the 200-500 watt range, it is believed that even higher power lasers could be successfully used, for example, in excess of 600 watts.

Crack 18 is formed in the glass down to the interface of the heated and cooled zones, that is, in the area of the maximum thermal gradient. The depth, shape and direction of the crack are determined by the distribution of the thermoplastic stresses, which in turn are dependent primarily on the following several factors:

the power density of the laser beam, the dimensions and shape of the heating zone produced by the laser beam;

the rate of relative displacement of the heating zone and the material;

the thermo physical properties, quality and conditions of supply of the coolant to the heated zone;

and the thermo physical and mechanical properties of the material to be cracked, its thickness, and the state of its surface.

Lasers operate by laser oscillation, which takes place in a resonant cavity defined by mirrors at each end. The concept of a stable resonator can best be visualized by following the path of a light ray through the cavity. The threshold of stability is reached if a light ray initially parallel to the axis of the laser cavity could be reflected forever back and forth between the two mirrors without escaping from between them.

Resonators which do not meet the stability criteria are called unstable resonators, because the light rays diverge away from the axis. There are many variations on the unstable resonator. One simple example is a convex spherical mirror opposite a flat mirror. Others include concave mirrors of different diameters (so that the light reflected from the larger mirror escapes around the edges of the smaller one), and pairs of convex mirrors.

The two types of resonators have different advantages and different mode patterns. The stable resonator concentrates light along the laser axis, extracting energy efficiently from that region, but not from the outer regions far from the axis. The beam it produces has an intensity peak in the center, and a Gaussian drop in intensity with increasing distance from the axis. Low-gain and continuous-wave lasers are primarily of this type.

The unstable resonator tends to spread the light inside the laser cavity over a larger volume. For example, the output beam may have an annular profile, with peak intensity in a ring around the axis.

Laser resonators have two distinct types of modes: transverse and longitudinal. Transverse modes manifest themselves in the cross-sectional profile of the beam, that is, in its intensity pattern. Longitudinal modes correspond to different resonances along the length of the laser cavity which occur at different frequencies or wavelengths within the gain bandwidth of the laser. A single transverse mode laser that oscillates in a single longitudinal mode is oscillating at only a single frequency; one oscillating in two longitudinal modes is simultaneously oscillating at two separate (but usually closely spaced) wavelengths.

The "shape" of the electromagnetic field within the laser resonator is dependent upon the mirror curvature, spacing, bore diameter of the discharge tube, and the wavelength. Small changes in mirror alignment, spacing or wavelength can cause dramatic changes in the "shape" of the laser beam (which is an electromagnetic field). A special terminology has evolved for describing the "shape", or energy distribution in space, of the beam, in which transverse modes are classified according to the number of nulls that appear across the beam cross section in two directions. The lowest-order, or fundamental mode, where intensity peaks at the center, is known as the $TEM_{00}$ mode. Such lasers are commonly preferred for many industrial applications. A transverse mode with a single null along one axis and no null in the perpendicular direction is $TEM_{01}$ or $TEM_{10}$, depending on orientation. $TEM_{01}$ and $TEM_{10}$ mode beams have been used in the prior art to deliver laser energy uniformly to the glass surface.

Figure 3:
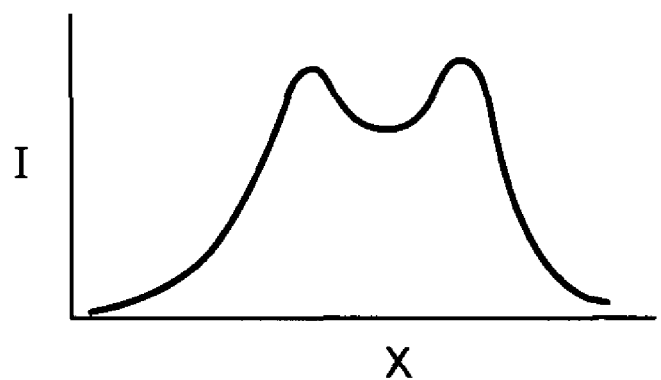
FIG. 3 graphically depicts an exemplary intensity profile of a multimoded laser beam.

The laser beam illustrated in FIG. 3 (beam intensity I vs. distance x across the beam), consists essentially of an annular ring. The center of the laser beam thus has lower power intensity than at least some of the outer regions of the laser beam, and may go completely to a zero power level, in which case the laser beam would be a 100 percent $TEM_{01*}$ power distribution. Such a laser beam is bimodal. That is, it incorporates levels of more than one mode, such as a combination of $TEM_{01*}$ and $TEM_{00}$ modes, wherein the power distribution of the center region merely dips below that of the outer region. In cases in which the beam is bimodal, the beam may incorporate greater than 50 percent $TEM_{01*}$, the remainder being the $TEM_{00}$ mode. However, as described above, multimoded laser devices needed to produce such optical power profiles may suffer from poor stability and may also be difficult to align and maintain.

It has been thought that non-Gaussian laser beams were preferred for laser scoring operations as they provided improved uniformity of energy distribution across the beam when compared to Gaussian laser beams. However, a beam having a Gaussian power distribution, when suitably manipulated, is capable of performing the requisite scoring function while taking advantage of the economics, stability and low maintenance associated with single-moded, Gaussian lasers.

Figure 4:
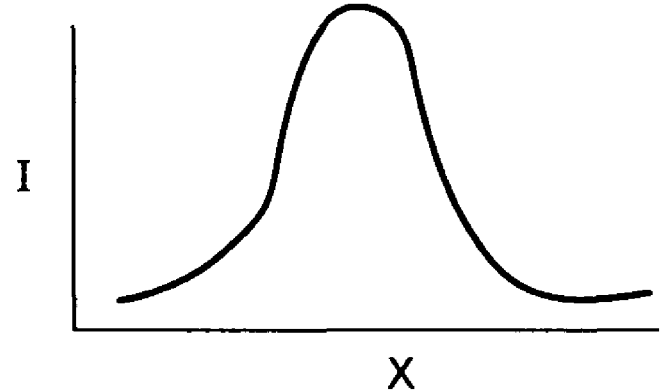
FIG. 4 graphically depicts an exemplary intensity profile of a single-moded laser beam.

In accordance with the present invention, a single-mode laser having a continuously emitting beam with a generally Gaussian power profile, a representative mode power distribution of which is illustrated in FIG. 4, is employed. Preferably, the beam is comprised essentially of the $TEM_{00}$ mode.

Figure 5:
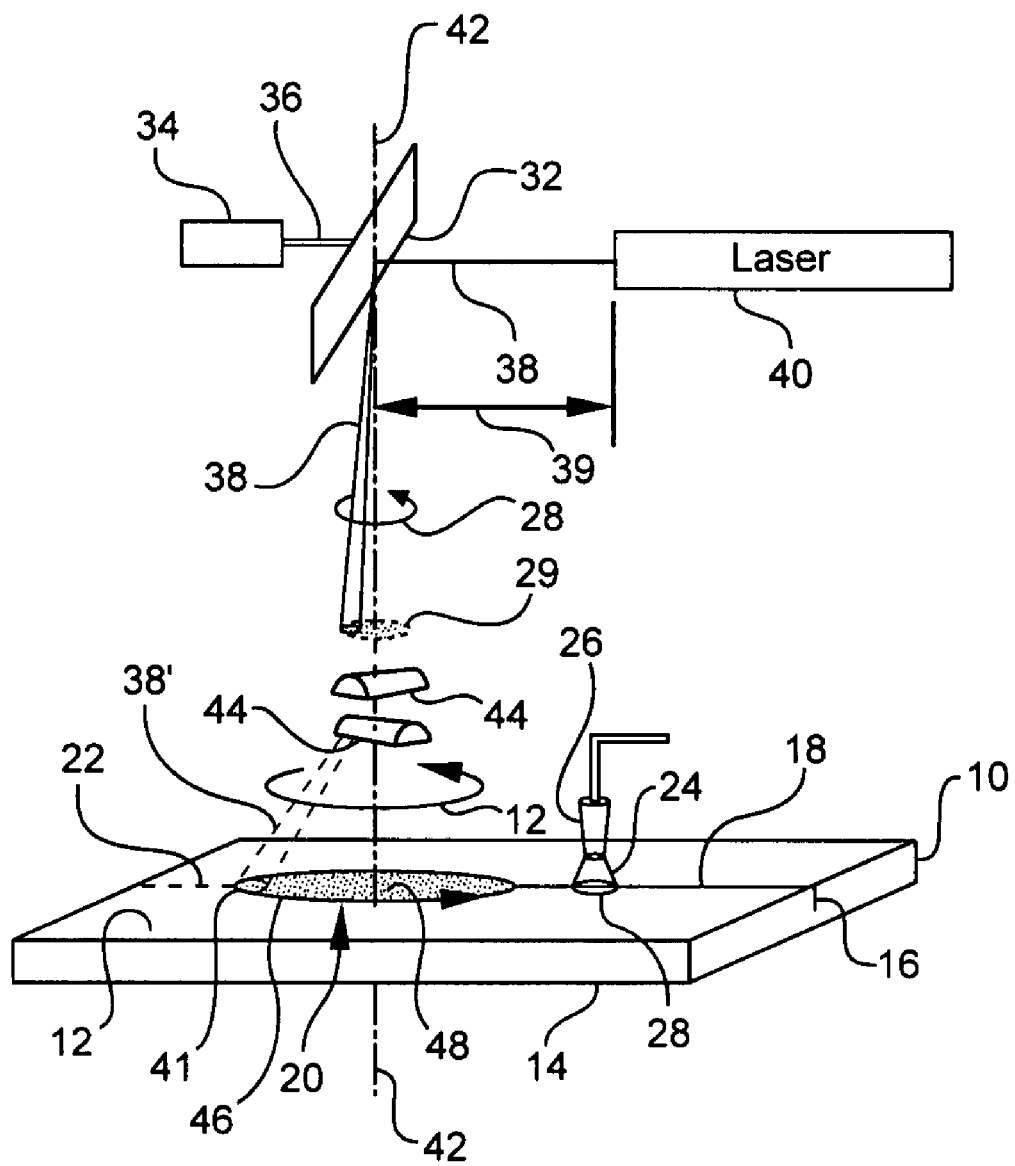
FIG. 5 is a side view of a system for laser scoring of a glass sheet according to an embodiment of the present invention wherein a mirror is used to deflect and orbit a continuously emitting laser beam about an axis, the laser beam orbit being elongated by optical elements and thereafter impinging upon the glass sheet to create an elongated heating zone.

In one embodiment of the invention illustrated in FIG. 5, a system controller (not shown), such as a digital computer, is operatively connected to the laser scoring system to control movement of the laser apparatus and/or the glass sheet, as well as other moving parts of the system. The system controller utilizes conventional machine control techniques to control movement of the various components of the system. Preferably, the system controller utilizes various production operating programs stored in its memory, each program designed to appropriately control movement of the laser or glass sheet (and other moving parts, if necessary) for a particular size glass sheet.

The system controller, inter alia, controls the movement of optical element 32 through actuator 34. Actuator 34 may be, for example, a galvanometer. In one embodiment, optical element 32 comprises a reflective element, such as a mirror, which is movably mounted and connected to actuator 34 through actuator arm 36. Actuator 34 is controlled by the controller to cause laser beam 38, which is being continuously emitted from laser 40, to describe a circular orbit about axis 42, as represented by orbit line 28. Radiation pattern 29 represents the orbiting characteristic of beam 38, wherein the lighter area in the center of the pattern indicates a reduced intensity over time compared to the outer region of the pattern. The circularly orbiting beam is transformed by passing the beam through one or more optical elements 44 such that beam 38' exiting the last optical element 44 describes an elongated or elliptical orbit about axis 42, represented by orbit line 30. Optical element 44 may be, for example, a cylindrical lens. The use of two cylindrical lenses arranged generally orthogonal to each other along their longitudinal axis, as depicted in FIG. 5 is advantageous since the length and width of the orbit may therefore be independently controlled by controlling the relative orientation of each lens to the other.

Figure 6:
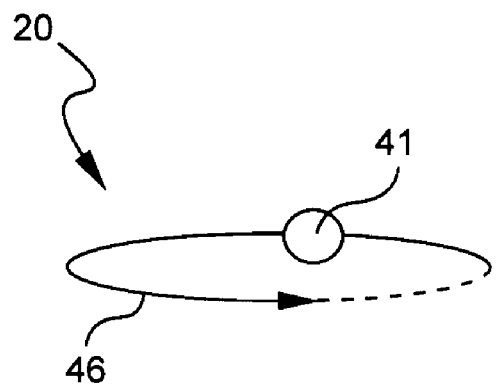
FIG. 6 is a representation of the heating zone created by the orbiting laser beam of FIG. 5 as the beam traces an elongated closed path on the glass sheet.
Figure 7:
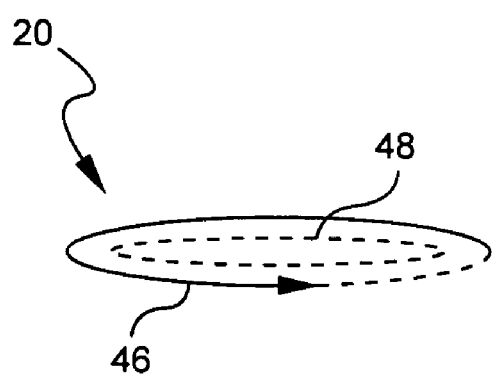
FIG. 7 is a representation of the elongated heating zone of FIGS. 5 and 6, indicating the central region of the heating zone having a lower temperature that the region of the heating zone adjacent the closed path.
Figure 8:
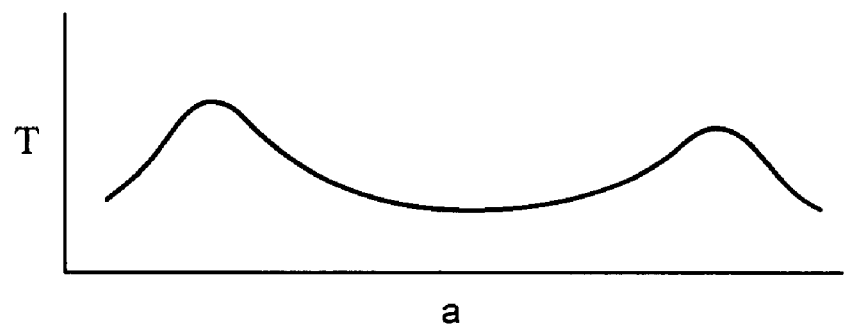
FIG. 8 graphically depicts an exemplary temperature profile across a width of the heating zone of FIGS. 5-7, indicating a center region having a lower temperature than an outer region.

Orbiting beam 38' exiting the at least one optical element 44 impinges at spot 41 on upper surface 12 of glass sheet 10. The orbiting spot 41 which beam 38' produces on glass sheet 10 traces a closed, elongated path 46 (also depicted in FIGS. 6 and 7) on the glass sheet to form elongated heating zone 20 on the glass sheet. Elongated heating zone 20 has a temperature minimum within inner portion 48 of the heating zone. FIG. 6 shows laser spot 41 as it traces elongated closed path 46 to produce heating zone 20. FIG. 7 is another view of heating zone 20 showing the central region 48 having a temperature lower than the temperature of the outer portion of heating zone 20 adjacent path 26. Thus, heating zone 20 has a temperature minimum within a central portion of the heating zone. A representative temperature profile showing the temperature minimum along minor axis a is illustrated in FIG. 8.

The system controller may further cause glass sheet 10 to be translated beneath orbiting laser beam 38' such that heating zone 20 follows predetermined path 22 along the glass sheet. Glass sheet 10 may be translated by a carriage assembly (not shown) which is moved, for example, by means of a linear actuator as is well known in the art. Alternatively, laser 40, associated optical elements and/or the laser mounting apparatus may be moved by mounting such components as constitute the laser system on a movable carriage assembly (not shown) to produce relative motion between the glass sheet and the impinging laser beam. This may advantageously be achieved with commercially available single-mode $CO_2$ lasers due to the small size, reliability, and lack of difficult-to-manage gas delivery piping found in such closed tube lasers when compared to gas flow lasers. The ability to move the optical components of a scoring system rather than the glass sheet to draw the score line is particularly important as the size of such glass sheets, such as for LCD display panels, become increasingly large and unwieldy. As previously described, coolant 24 is preferably directed from nozzle 26 against the glass in a trailing position along path 22 relative to movement of the heating zone. Path 22 is typically a straight path, particularly for LCD display panels. However, path 22 need not be straight and may include curves or other direction changes as may be needed according to the application.

Alternatively, laser 40 may be stationary while optical elements 32 and 44 move, such as by mounting optical elements on a moving carriage. The carriage is then moved relative to the glass sheet. The laser beam emitted from laser 40 targets optical element 32, which now is being translated relative to the glass sheet, as well as being moved by actuator 34 so that the beam describes a circular orbit about axis 42. Unfortunately, in such a configuration, the beam length 39 between the output face of laser 40 and optical element 32 lengthens as the moving carriage on which optical elements 32 and 44 are mounted traverses the glass sheet. The lengthening beam length between laser 40 and optical element 32 increases the divergence of laser beam 38, therefore modifying heating zone 20 by modifying the size of the radiation spot (spot size) from beam 38' impinging on the glass. That is, as the beam length increases and laser beam 38 diverges as a result, the spot size increases. The increased spot size may in turn undesirably reduce the heating effectiveness of the heating zone, such as by increasing the size of the heating zone. To compensate for the increasing beam divergence, movement of optical element 32 may be modified by the system controller in conjunction with the traverse of optical elements 32 and 44 relative to the glass sheet such that the radius of the circular orbit described by laser beam 38 about axis 42 varies as optical elements 32, 44 traverse the glass sheet. It is desirable that, as beam length 39 between laser 40 and optical element 32 increases, that is, as the distance between laser 40 and optical element 32 increases, the radius of the circular orbit about axis 42 decreases to maintain a constant spot size and therefore a non-varying heating zone. Conversely, as the distance between laser 40 and optical element 32 decreases, the radius of the circular orbit about axis 42 is increased. Thus, as optical elements 32 and 44 traverse the glass sheet, heating zone 20 remains substantially unchanged. The system controller, which drives actuator 34, may be easily programmed with the appropriate instructions to accomplish the requisite change in the circular orbit of laser beam 38. Position sensors (not shown) may be located on the carriage on which optical elements 32 and 44 are mounted to provide carriage position information to the system controller. Alternatively, position sensors may be stationary and mounted adjacent to the carriage along the carriage path. Various conventional methods of detecting position are known and will not be covered here in the interest of simplifying this disclosure. However, such position sensors may include laser-based devices, infrared-based devices, sonic devices and so forth.

Figure 9:
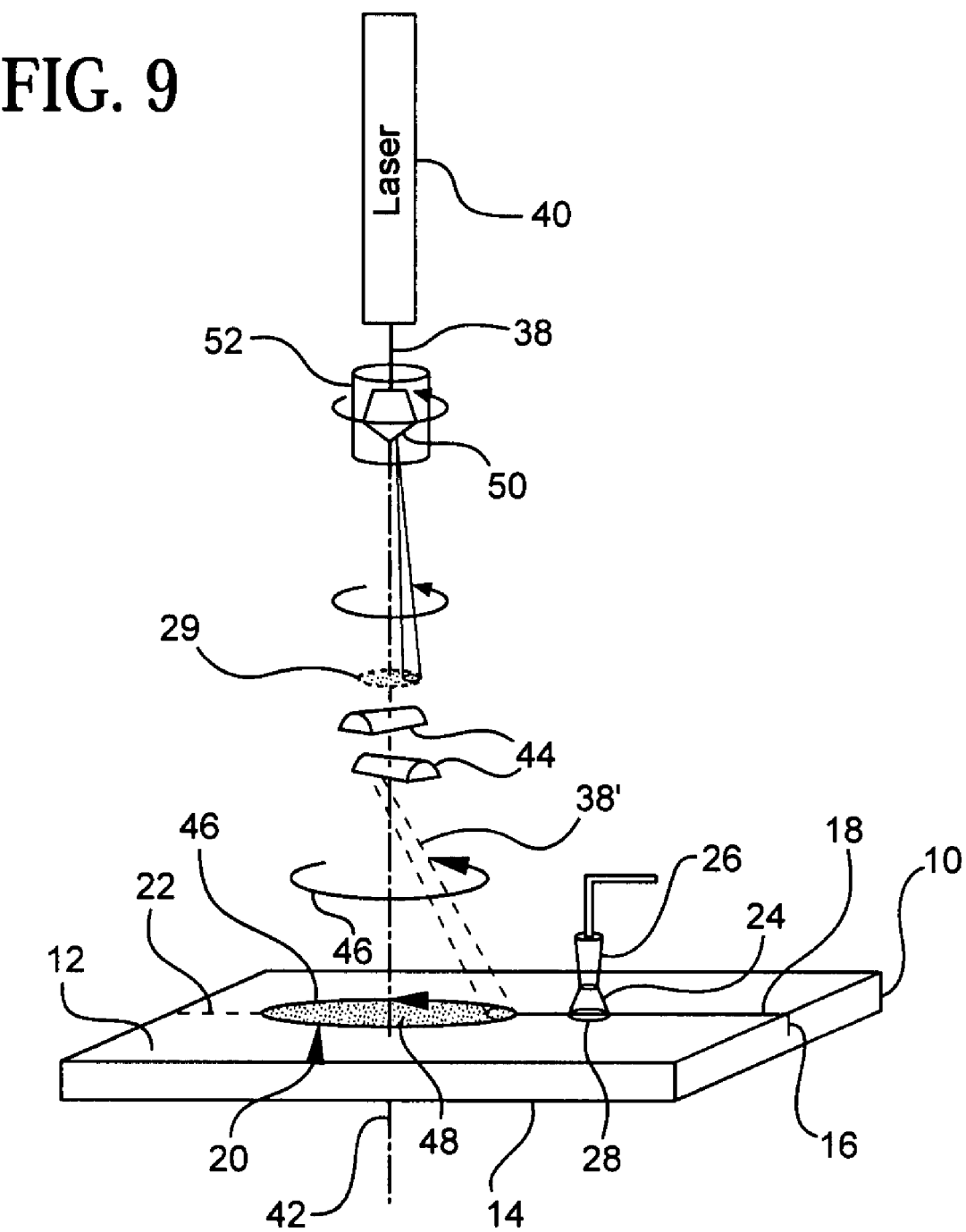
FIG. 9 is another embodiment of the present invention wherein a rotating optical element is used to deflect and orbit a continuously emitting laser beam about an axis, the laser beam being elongated by optical elements and thereafter impinging upon the glass sheet to create an elongated heating zone.

Another embodiment of the apparatus which may be used to practice the present invention is depicted in FIG. 9. Continuously emitted laser beam 38 is directed through optical element 50 prior to being transformed by optical element 44. Optical element 50 directs beam 38 off axis 42. Optical element 50 is rotated about axis 42, causing beam 38 to rotate about axis 42 in a circular orbit. For example, optical element 50 may be a faceted element, such as a prism, or an appropriate lens mounted in the hollow shaft of a motor, wherein rotation of the motor shaft rotates the prism or lens about the rotational axis of the shaft. Optical element 50 preferably comprises a refractive element. In the embodiment shown in FIG. 9, optical element 50 is mounted in a suitable mounting bracket which is rotated by an externally mounted motor (not shown), such as through a drive belt. As in the preceding embodiment, the circularly orbiting beam is directed through at least one optical element 44, preferably at least two optical elements, to transform the beam such that it describes an elongated closed path 46 on glass sheet 10 as previously described. The present embodiment is advantageous in that optical element 50 can be rotated much faster than optical element 32 can be manipulated by actuator 34 through actuator arm 36, therefore the heat distribution (and therefore temperature profile) across heating zone 28 produced by the orbiting beam may be more predictably formed.

Figure 10:
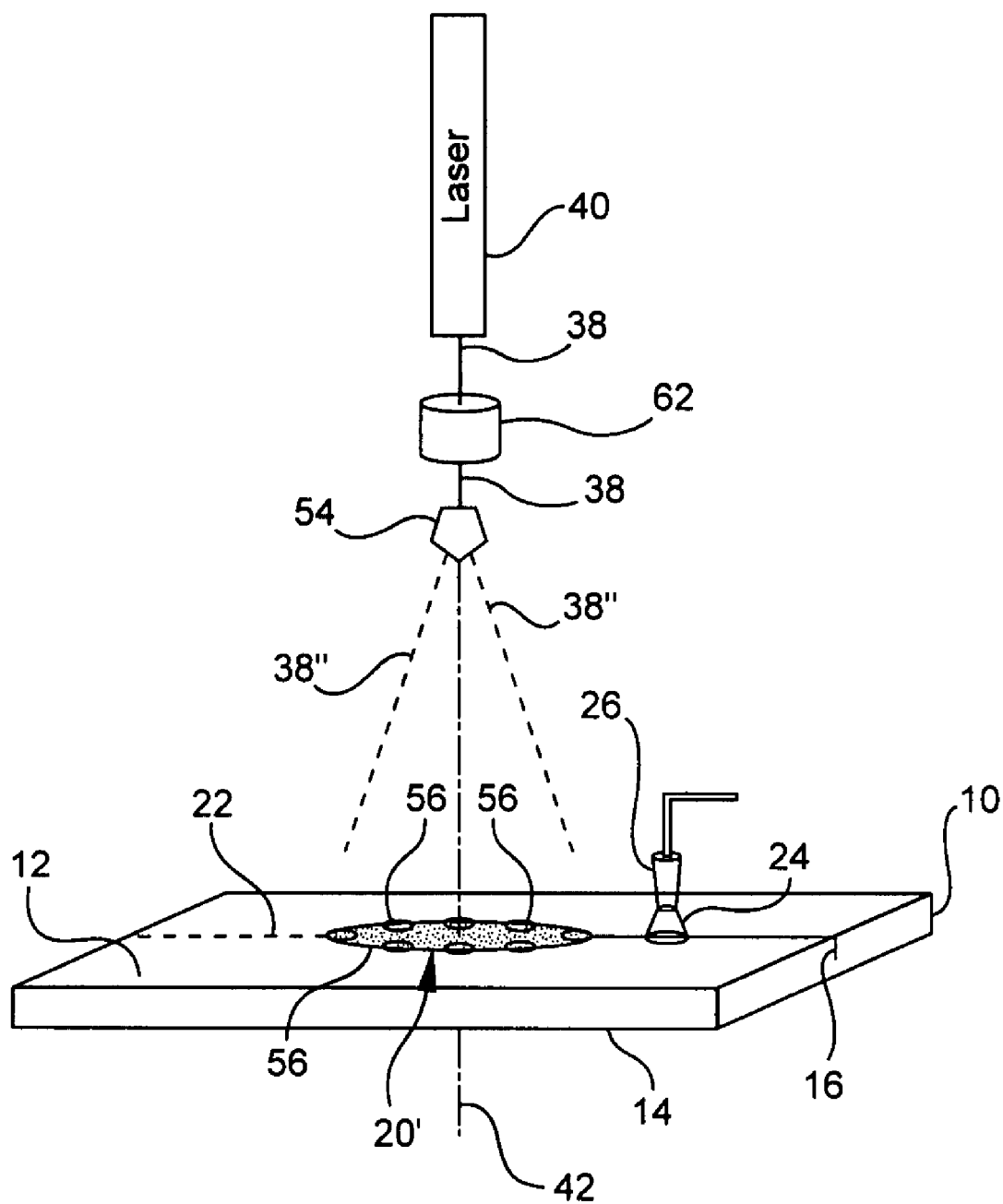
FIG. 10 is another embodiment according to the present invention wherein an integrating optical element is used to divide a continuously emitting single-moded laser beam into a plurality of laser beams, the laser beams impinging upon a glass sheet in an elongated pattern to form an elongated heating zone.
Figure 11:
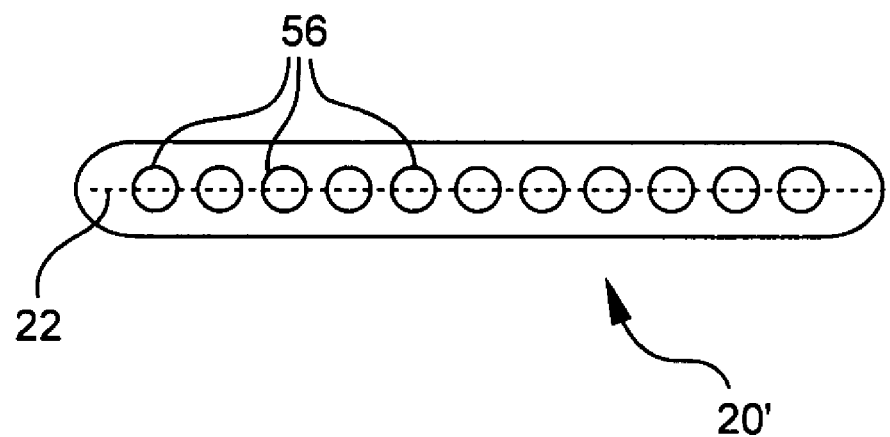
FIG. 11 is an illustration of an elongated pattern according to FIG. 10 wherein the pattern is a straight line.
Figure 12:
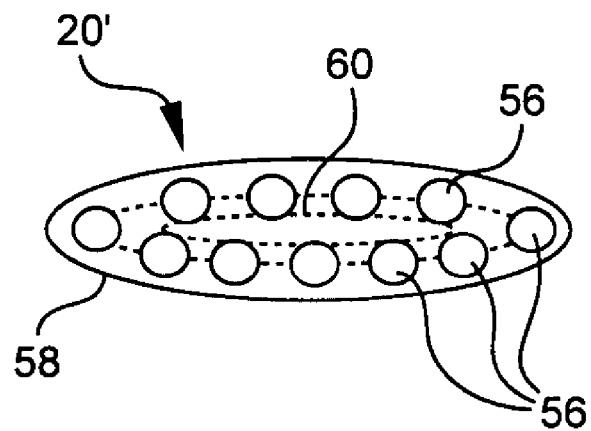
FIG. 12 is an illustration of an elongated pattern according to FIG. 10 wherein the pattern is elliptical.

In still another embodiment illustrated in FIG. 10, continuously emitted laser beam 38 is directed through integrating optical element 54 (hereinafter, integrating element 54) which breaks up the beam and redistributes it in an elongated, but discontinuous pattern. That is, beam 38 emitted from laser 40 is refracted into a plurality of discrete beams 38", each of the discrete beams displaying a substantially Gaussian intensity profile, and wherein the discrete beams are individually distributed in an elongated pattern. The elongated pattern may be a straight line, as depicted in FIG. 11. Preferably, the elongated pattern is generally rectangular or elliptical in character, as shown in FIG. 12, such that discrete beams 38" impinge on glass surface 12 around the periphery of a geometric pattern having a perimeter 58 and an interior portion 60 surrounded by the perimeter. Thus, continuous elongated heating zone 20 which is achieved by the previous embodiments may be approximated, as depicted by heating zone 20', by the use of integrating optical element 54. The plurality of radiation spots generated by integrating element 54 produce a plurality of individual small heating zones where each beam 38" impinges the glass sheet, which taken together, produce a much larger, single elongated heating zone, as indicated in FIG. 12, preferably having a temperature minimum within the large heating zone.

Laser beam 38 is preferably collimated by collimator 62 before the beam enters integrating optical element 50. Methods of collimating a laser beam are well known in the art and therefore not discussed further here. The use of an integrating optical element may be advantageous because it eliminates moving parts, such as the rotating or otherwise moving optical elements of the previous embodiments, leading to greater reliability. The number of discrete beam projections from the integrating optical element may be controlled by the number and relationship to each other of the facets formed on the integrating element, but may range from as few as six, to tens of discrete beams to hundreds or thousands of beams, depending upon, inter alia, the thickness d of the glass sheet to be scored and the speed at which the heating zone traverses the surface of the glass sheet.

While various descriptions of the present invention are described above, it is understood that the various features described in connection with the embodiments of the present invention can be used singly or in combination thereof. Therefore, this invention is not to be limited to the specifically preferred embodiments depicted therein.

It will be apparent to those skilled in the art that various other modifications and variations can be made to the present invention without departing from the spirit and scope of the invention. For example, although the general scoring methods disclosed herein are described with respect to sheets of glass, they may be further applied to other brittle materials, such as glass-ceramics. Thus it is intended that the present invention cover the modifications and variations of this invention provided they come within the scope of the appended claims and their equivalents The following examples, which are intended to be illustrative rather than limiting, demonstrate methods in accordance with the present invention.

EXAMPLE

A single-mode $CO_2$ laser having a power of between about 250 and 500 watts is passed through a collimator, wherein a substantially collimated beam exits the collimator. The collimated beam is thereafter passed through an integrator lens which redistributes the single beam into a plurality of discrete beams. The discrete beams are impinged upon the surface of a glass sheet in an elongated pattern, thereby forming an elongated heating zone wherein the optical power impinging on an outer region of the heating zone is greater than the optical power impinging upon a central portion of the elongated heating zone. Relative motion is developed between the heating zone and the glass sheet wherein the heating zone traverses the glass sheet at a rate of at least about 300 mm/s. A coolant is jetted against the glass sheet behind the traversing heating zone. The heating zone is at least about 30 mm in length along a direction parallel with the direction of relative motion.

What is claimed is:

1. A method for scoring a glass sheet comprising:
   moving a continuously emitting laser beam having a substantially Gaussian intensity profile in a circular orbit about an axis with a reflecting optical element;
   directing the circularly orbiting laser beam through at least one optical element to transform the circularly orbiting laser beam into a laser beam having an elongated beam orbit;
   impinging the laser beam with the elongated beam orbit on the glass sheet to describe an elongated closed path on the glass sheet, thereby forming an elongated heating zone on the sheet having a temperature minimum within a central portion of the heating zone;
   traversing the elongated heating zone along a pre-determined scoring path on the glass sheet; and
   wherein the elongated heating zone induces tensile stresses that exceed a tensile strength of the glass sheet to develop a crack in the glass sheet.

2. The method according to claim 1 wherein the step of moving comprises refracting the continuously emitting laser beam through a rotating optical element to produce the circularly orbiting laser beam.

3. The method according to claim 2 wherein the rotating optical element comprises a plurality of facets.

4. The method according to claim 1 wherein the step of moving comprises reflecting the continuously emitting laser beam from a moving mirror to produce the circularly orbiting laser beam.

5. The method according to claim 1 further comprising contacting the scoring path with a coolant.

6. The method according to claim 4 wherein the continuously emitting laser beam is emitted from a stationary laser beam source and further comprising moving the mirror relative to the stationary laser beam source to vary a beam length between the stationary laser beam source and the mirror and wherein a radius of the circular orbit varies in response to the varying beam length.

7. A method for scoring flat glass sheets comprising:
   directing a continuously emitting laser beam emitted from a stationary laser beam source and having a substantially Gaussian intensity profile to a first optical element;

moving the first optical element to cause the continuously emitting laser beam to describe a circular orbit about an axis;

directing the circularly orbiting laser beam through a second optical element, thereby transforming the circularly orbiting laser beam into an elongated beam orbit about the axis;

impinging the laser beam with the elongated beam orbit on a glass sheet to describe an elongated closed path on the glass sheet, thereby forming an elongated heating zone on the sheet, the heating zone further having a temperature minimum within a central portion of the heating zone;

traversing the elongated heating zone along a predetermined scoring path on the glass sheet; and wherein the traversing comprises moving the first optical element relative to the stationary laser beam source thereby varying a beam length of the laser beam, and varying a radius of the circular orbit in response to the varying beam length.

8. The method according to claim 7 wherein the rotating optical element is a refracting optical element comprising a plurality of facets.

9. The method according to claim 7 wherein the second optical element is a cylindrical lens.

10. The method according to claim 7 further comprising contacting the scoring path with a coolant.

11. A method for scoring flat glass sheets comprising:
collimating a continuously emitting laser beam having a substantially Gaussian intensity profile;

directing the collimated laser beam through a faceted refractive optical element to obtain a plurality of scoring beams having substantially Gaussian intensity profiles; and impinging the plurality of scoring beams on a glass sheet in an elliptical pattern to form a single elliptical heating zone; and traversing the elliptical heating zone along a predetermined scoring path on the glass sheet to score the glass sheet.

12. The method according to claim 11 wherein the elliptical heating zone has a temperature minimum within a central portion of the heating zone.

13. The method according to claim 11 wherein the plurality of beams comprises at least about 6 beams.

14. The method according to claim 11 wherein the length of the elliptical heating zone is at least about 30 mm.

15. The method according to claim 1 further comprising contacting the scoring path with a coolant.

* * * * *